US012683482B2

(12) United States Patent
Gupta et al.

(10) Patent No.: US 12,683,482 B2
(45) Date of Patent: Jul. 14, 2026

(54) HIGH-EFFICIENCY DRIVE CIRCUIT AND BIDIRECTIONAL FET

(71) Applicant: Wisconsin Alumni Research Foundation, Madison, WI (US)

(72) Inventors: Chirag Gupta, Madison, WI (US); Shubhra S. Pasayat, Middleton, WI (US); Daniel Ludois, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 294 days.

(21) Appl. No.: 18/371,248

(22) Filed: Sep. 21, 2023

(65) Prior Publication Data

US 2024/0120825 A1     Apr. 11, 2024

Related U.S. Application Data

(60) Provisional application No. 63/378,301, filed on Oct. 4, 2022.

(51) Int. Cl.
*H02M 1/08* (2006.01)
(52) U.S. Cl.
CPC ..................................... *H02M 1/08* (2013.01)
(58) Field of Classification Search
CPC ....................................................... H02M 1/08
See application file for complete search history.

(56) References Cited

U.S. PATENT DOCUMENTS

| | | | | |
|---|---|---|---|---|
| 5,608,235 A | * | 3/1997 | Pezzani .................. | H10D 18/80 |
| | | | | 257/119 |
| 2006/0255377 A1 | | 11/2006 | Tu | |
| 2009/0231018 A1 | * | 9/2009 | Dittrich .................. | H02M 1/08 |
| | | | | 327/365 |
| 2011/0026285 A1 | | 2/2011 | Kawashima et al. | |
| 2012/0018735 A1 | | 1/2012 | Ishii | |
| 2017/0104076 A1 | | 4/2017 | Prechtl et al. | |
| 2021/0006244 A1 | * | 1/2021 | Takizawa ................ | H02M 1/08 |
| 2022/0165853 A1 | | 5/2022 | Kantarovsky et al. | |
| 2024/0113611 A1 | * | 4/2024 | Kaufmann .............. | H02M 1/08 |

FOREIGN PATENT DOCUMENTS

JP        2010172067 A      8/2010

OTHER PUBLICATIONS

International Search Report for PCT/US2023/033440.

* cited by examiner

*Primary Examiner* — Alex Torres-Rivera
(74) *Attorney, Agent, or Firm* — Boyle Fredrickson, S.C.

(57)        ABSTRACT

A drive system suitable for motors and the like employs bidirectional FETs with active gate current sourcing and sinking to eliminate series diode losses. In one embodiment, the bidirectional FETs have floating field plates that can be dynamically biased according to device polarity.

11 Claims, 3 Drawing Sheets

HIGH-EFFICIENCY DRIVE CIRCUIT AND BIDIRECTIONAL FET

CROSS REFERENCE TO RELATED APPLICATION

This application claims the benefit of U.S. provisional application 63/378,301 filed Oct. 4, 2022 and hereby incorporated by reference in its entirety.

BACKGROUND OF THE INVENTION

The present invention relates to a high-efficiency power converter, for example, useful for motor drives, and in particular to a high-efficiency power converter using a bidirectional FET architecture.

Power semiconductors such as field-effect transistors (FETs) find use in a variety of power conversion circuits such as matrix converters, cyclo-converters, and current source inverters, where they synthesize AC waveforms, for example, that may be used for driving motors or the like. Such circuits may use bidirectional switching elements that can controllably block or conduct current in either of two polarities.

Typically, bidirectional switching elements are fabricated using two FET devices, for example, arranged in series with opposite polarities, each device shunted by a diode to steer current to the proper FET polarity depending on the polarity of voltage applied to the switching element. These diodes produce a forward diode voltage drop when conducting resulting in a significant power loss at high currents.

SUMMARY OF THE INVENTION

The present invention provides a bidirectional FET switch employing a single gate architecture that eliminates power loss from shunting diodes. A special gate drive circuit provides high-speed switching of the bidirectional FET by actively sinking and sourcing gate currents. In one embodiment the FET further provides dynamic biasing of the field plates for improved performance. This design may thus provide a first and third quadrant switch and eliminate operation in second and fourth quadrant where diode voltage drop occurs.

Specifically, in one embodiment, the invention provides an electrical power converter circuit having a set of bidirectional FET semiconductor switches each providing a semiconductor substrate having a first and second channel electrode separated along a channel through the substrate and a gate electrode positioned along the channel between the channel electrodes, where current flowing in a first polarity from the first channel electrode to the second channel electrode and current flowing in a second polarity from the second channel electrode to the first channel electrode are both controlled by a gate voltage applied to the gate electrode to switch between current flow and no current flow states. A gate drive circuit provides a gate drive signal to the gates of each of the set of bidirectional FET semiconductor switches dynamically referenced to a different one of the first channel electrode and second channel electrode depending on a voltage polarity between the first and second channel electrodes, the gate drive circuit including semiconductor switches sourcing and sinking current to and from the gate.

It is thus a feature of at least one embodiment of the invention to provide a gate drive circuit that can rapidly switch a bidirectional FET by both sinking and sourcing current to its gate, thus providing switching speed necessary for high power conversion circuits.

The electrical power converter may further include a semiconductor switch drive providing a control signal to the semiconductor switches having an on-state for sourcing current to the gate by the semiconductor switches and an off-state for sinking current from the gate by the semiconductor switches during each polarity of current flow.

It is thus a feature of at least one embodiment of the invention to provide a circuit that can switch the FET both on and off in both polarities.

The electrical power converter circuit may further include an electrical isolator providing galvanic isolation between the control signal and the semiconductor switches.

It is thus a feature of at least one embodiment of the invention to allow the biasing circuit to float with respect to the control signal to rapidly accommodate different polarities applied to the terminals of the bidirectional FET semiconductor.

The electrical power converter circuit may further include a galvanically isolated DC power supply providing a voltage to the semiconductor switches.

It is thus a feature of at least one embodiment of the invention to isolate the high-voltage of the FET from the control electronics.

The semiconductor switches may provide series connected solid-state switches communicating with the gate at their junction, with a first switch controlling current flow from the DC power supply to the gate and a second switch controlling current flow from the gate to a ground referenced to a given one of the first and second channel electrodes having a lower voltage. In one embodiment, the first transistor may be an NPN transistor and the second transistor may be a PNP transistor It is thus a feature of at least one embodiment of the invention to provide a circuit arrangement that can both source and sink current with a single control signal.

The electrical power converter circuit may further include a diode half-bridge providing series-connected diodes defining at their junction the ground reference with a first diode connected between the ground reference and a first channel electrode communicating with the cathode side of the first diode and a second diode connected between the ground reference and a second channel electrode communicating with the cathode side of the second diode.

It is thus a feature of at least one embodiment of the invention to provide a simple method of establishing a ground reference that automatically adjusts to changes in polarity of the power applied to the bidirectional FET semiconductor.

The bidirectional FET semiconductor switches may further include at least one field plate positioned over the channel to a side of the gate and free from fixed galvanic connection to any of the gate electrode and first and second channel electrodes.

It is thus a feature of at least one embodiment of the invention to provide a bidirectional FET having field plates that can be switched to accommodate bidirectional polarity.

In this case, the electrical power converter circuit may provide a biasing switch connecting the at least one field plate to a given one of the first and second channel electrodes having a lower voltage.

It is thus a feature of at least one embodiment of the invention to provide for dynamic biasing of the field plates according to the polarity applied to the bidirectional FET.

The invention further contemplates a bidirectional field-effect transistor having a transistor package holding a semiconductor substrate and first and second channel electrodes formed on the semiconductor substrate in opposition across the channel in the semiconductor substrate. The transistor may further provide a gate electrode formed on the semiconductor substrate for controlling current through the channel between the first and second electrodes through a field effect and at least one field plate positioned over the channel to a side of the gate free from galvanic connection to any of the gate electrode and first and second channel electrodes. A set of terminals may extend from the transistor package to provide separate connections to each of the first and second channel electrodes, gate electrode, and field plate.

It is thus a feature of at least one embodiment of the invention to provide a bidirectional FET well adapted for use in power conversion circuits where dynamic biasing of the field plates may be desired.

The field plates may include a first and second field plate positioned on opposite sides of the gate communicating with at least one of the set of terminals.

It is thus a feature of at least one embodiment of the invention to provide a device that allows selection between field plates on different sides of the gate according to the polarity applied to the device.

In some embodiments, the field plates on each side may include upper and lower field plates separately connected to terminals.

It is thus a feature of at least one embodiment of the invention to allow adjustment of the field plates according to the intended voltage to be applied to the bidirectional FET.

These particular objects and advantages may apply to only some embodiments falling within the claims and thus do not define the scope of the invention.

DETAILED DESCRIPTION OF THE PREFERRED EMBODIMENT

Figure 1:
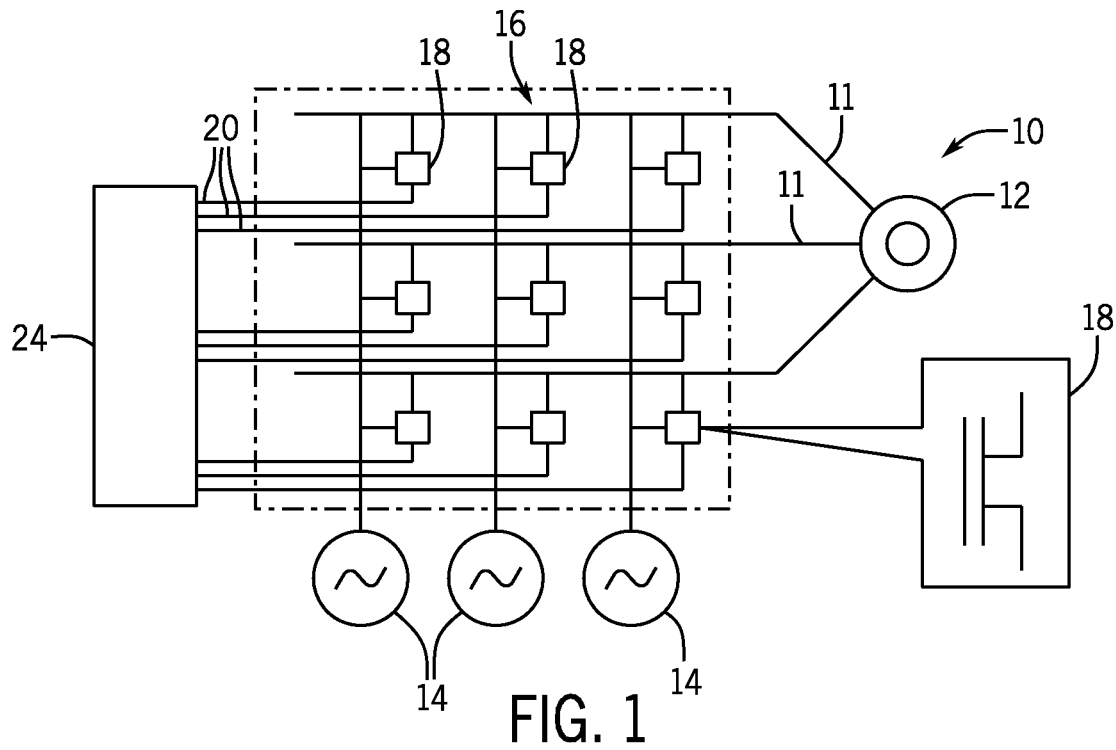
FIG. 1 is a simplified architecture of a matrix power converter used to convert a three-phase AC signal to three-phase motor drive currents that can employ the bidirectional semiconductor switching circuitry of the present invention having bidirectional semiconductor switches.

Referring now to FIG. 1, an example circuit architecture suitable for use in the present invention provides a matrix power converter 10 of the type providing three-phase output power 11 to a motor 12. The three-phase output power 11 may be synthesized from three-phase input power 14 by using a matrix 16 of bidirectional semiconductor switches 18 each providing a switchable bidirectional interconnection between each of the three phases of input current to each of the three phases of output power 11 to the motor 12. Each bidirectional semiconductor switch 18 may receive a control signal 20 from a controller 24 to controllably switch the bidirectional semiconductor switch 18 on or off while the bidirectional semiconductor switch 18 is subject to different (opposite) voltage polarities. In this regard, each of the bidirectional semiconductor switches 18 must be able to conduct current in both voltage polarities and to block current in both voltage polarities.

Generally, the control signals 20 may be developed by known techniques by controller 24 so that the synthesized waveform of the output currents 11 may differ in phase, amplitude and frequency from the three-phase input power 14. A matrix converter 10 per the invention may operate to provide output AC waveforms having an amplitude in excess of 50 V at average currents in excess of one ampere and suitable for use with motors of one horsepower or more.

Figure 2:
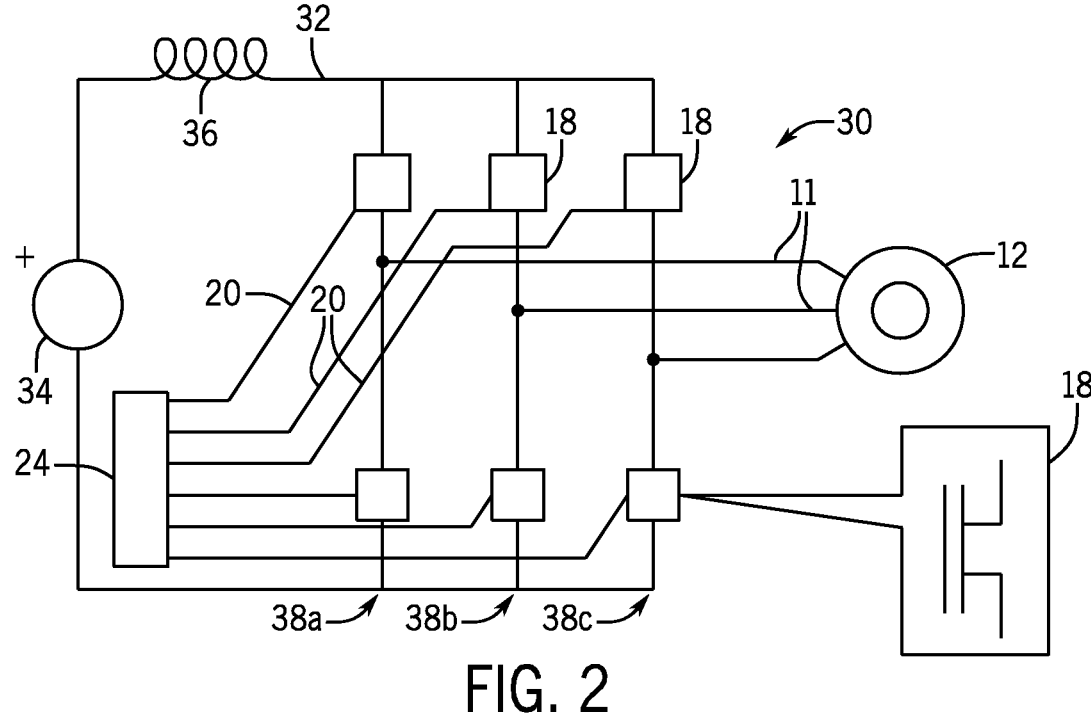
FIG. 2 is a figure similar to that of FIG. 1 showing a current source converter for converting a DC source to a three-phase motor drive current such as is also suitable for use with the bidirectional semiconductor switching circuitry of the present invention.

Referring now to FIG. 2, a second example circuit provides for a current source inverter 30 receiving DC power 32, for example, implemented by a DC voltage source 34 in series with an inductor 36. The DC power 32 is applied across a set of half bridge elements 38a, 38b, and 38c each consisting of a pair of series-connected bidirectional semiconductor switches 18 spanning the DC power 32 and, at their junction, providing one phase of the output power 11 to the motor 12. Again, each of the bidirectional semiconductor switches 18 may receive a control signal 20 from the controller 24 to provide the desired synthesis of the output three-phase output power 11 according to a timing sequence generally understood in the art.

The invention may also be useful in current source inverters where two back to back current source inverters are linked by a DC inductor but interface between two AC system.

Figure 3:
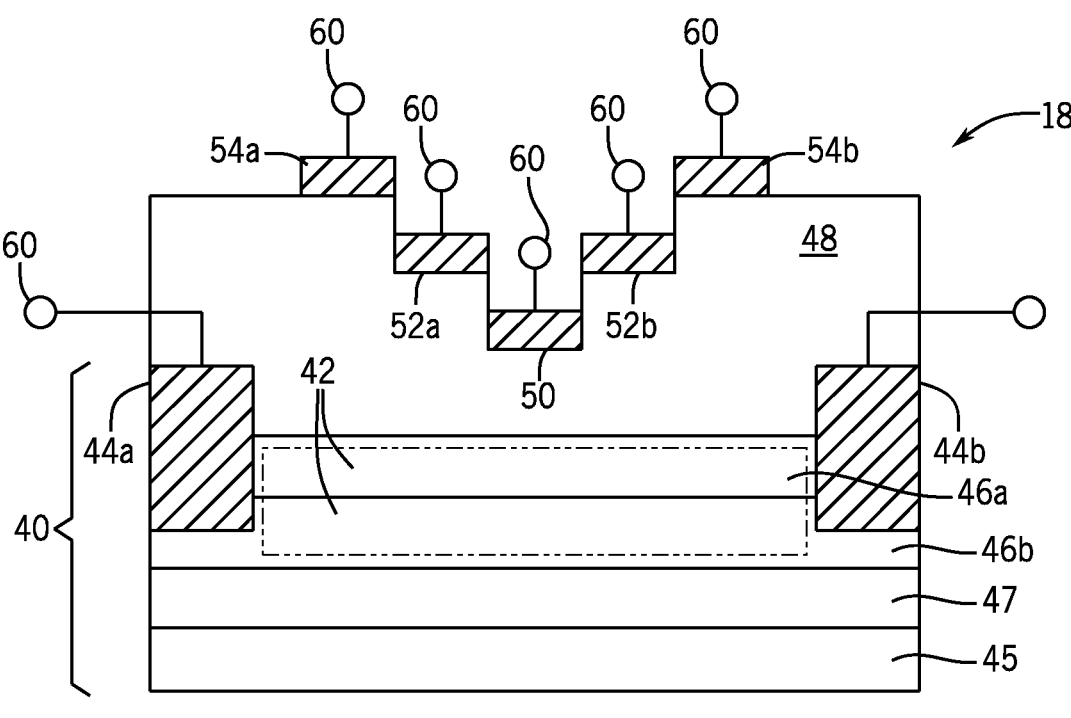
FIG. 3 is a side elevational cross-section of a bidirectional semiconductor switch suitable for use in the circuits of FIGS. 1 and 2 showing one field plate architecture.

Referring now to FIG. 3, in one embodiment, the bidirectional semiconductor switch 18 may provide for a semiconductor substrate 40 defining a barrier region 42 between a first and second channel electrode 44a and 44b. These electrodes 44 will operate as either source or drain terminals in an FET depending on the polarity of voltage applied across the channel electrodes 44a and 44b as will be discussed. The channel electrodes 44 will generally be a metallic conductive material such as aluminum or copper or a combination of an annealed metal stack such as TiN, Ti/Al/Ni/Au to form ohmic contact. The electrode region may also entail regrowth of heavily doped semiconductor region and electrode deposition on top of it.

In one embodiment the barrier region 42 may be a heterojunction between two layers 46a and 46b, for example, layer 46a being aluminum gallium nitride (AlGaN) and layer 46b being gallium nitride (GaN). Furthermore, layer 46a, may itself contain multiple layers and layer 46b may contain multiple layers to provide highly conductive channel region, for example, using thin 0.7 nm AlN/thick 25 nm 25% AlGaN. However, the barrier region 42 will form at the interface of 46a and 46b. More generally, the gallium nitride of each of these layers 46 may be substituted with a material of a form GaX where X is selected from the elements of B, Al, Ga, In, N.

The barrier region 42 may be supported by a supporting support layer 45, for example, a heterogenous substrate (e.g., Si, SiC, Sapphire etc.) or homogenous substrate (e.g., GaN, AlN) and can exhibit multiple polarities. The supporting layer 45 is isolated from the barrier region 42 by a buffer layer 47 such as Ga-Polar, Al-Polar, N-Polar, Semi-Polar or Non-Polar (m-plane or a-plane) as is generally understood in the art. Buffer layer 47 may also contain multiple layers and doping (Carbon or Iron) to achieve the required effect of "buffer" as commonly understood for power electronic semiconductor GaN HEMT devices.

The barrier region 42 is capped with a dielectric or insulating layer 48 such as SiO2, SiNx, AlOx, transition metal oxides and nitrides, etc. on which is placed a gate electrode 50 controlling the flow of current between channel electrodes 44a and 44b through a field effect. In another embodiment, the gate electrode 50 can be directly placed on top of the AlGaN barrier and is isolated from the channel through the AlGaN barrier and schottky barrier (between metal and AlGaN). The gate electrode 50 may also, like electrodes 44, be a conductive metal and is galvanically isolated from the channel by the dielectric layer 48. In one embodiment the gate electrode 50 may be placed halfway between the channel electrodes 44a and 44b along the barrier region 42.

Flanking the gate electrode 50 are left and right field plates 52a and 52b. These field plates 52 may be elevated with respect to the barrier region 42 above the gate electrode 50 and will also be conductive metals. Elevated slightly above the field plates 52 and to the left and right of the gate electrode 50 and the field plates 52 are field plates 54a and 54b. Importantly each of the field plates 52 and 54 are galvanically isolated from the channel electrodes 44 and the gate electrode 50. During use of the bidirectional semiconductor switch 18, either one or both of the field plates 54 and 52 may be used depending on the intended voltage of operation of the bidirectional semiconductor switch 18.

Figure 4:
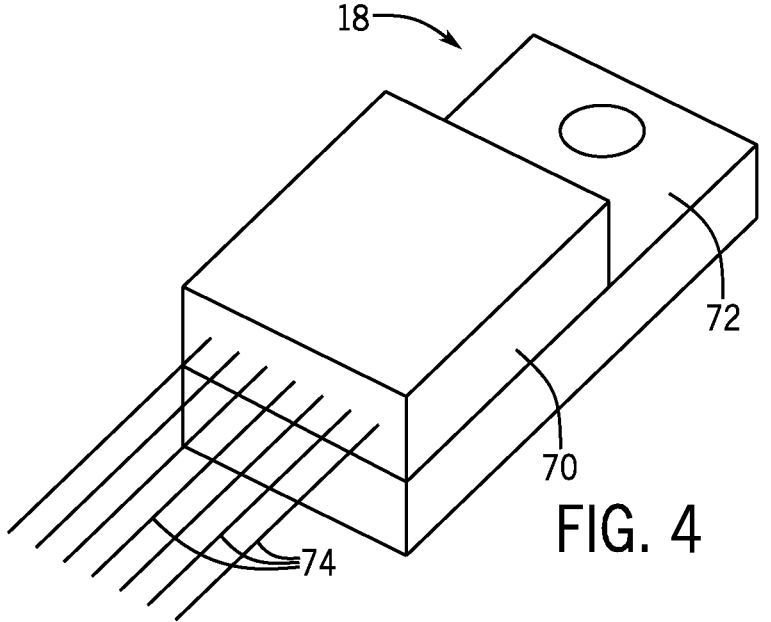
FIG. 4 is a perspective view of the bidirectional semiconductor switch of FIG. 3 in a package showing exposed connection terminals.

Referring now also to FIG. 4, the electrically active components of the bidirectional semiconductor switch 18 may be encased in a protective housing 70 such as an electrically insulating thermoplastic. In the embodiment where each of the channel electrodes 44, gate electrode 50, and field plates 52a, 52b 54a and 54b are galvanically isolated within the package 70, each of these electrodes and field plates may have separate terminals 60 allowing independent electrical connection and may be exposed from the insulating housing 70 by separate conductive leads 74 allowing individual electrical connection thereto.

Alternatively, it will be understood that the number of conductive leads 74 may be reduced by, for example, internally connecting field plates 52a and 54a to a single terminal 60 and internally connecting field plates 52b and 54b to a single electrical terminal 60 reducing the number of exposed conductive leads 74 to five. Alternatively, all of the field plates may be connected to a single terminal 60 further reducing the number of exposed conductive leads 74 in this case to four.

Figures 5, 6:
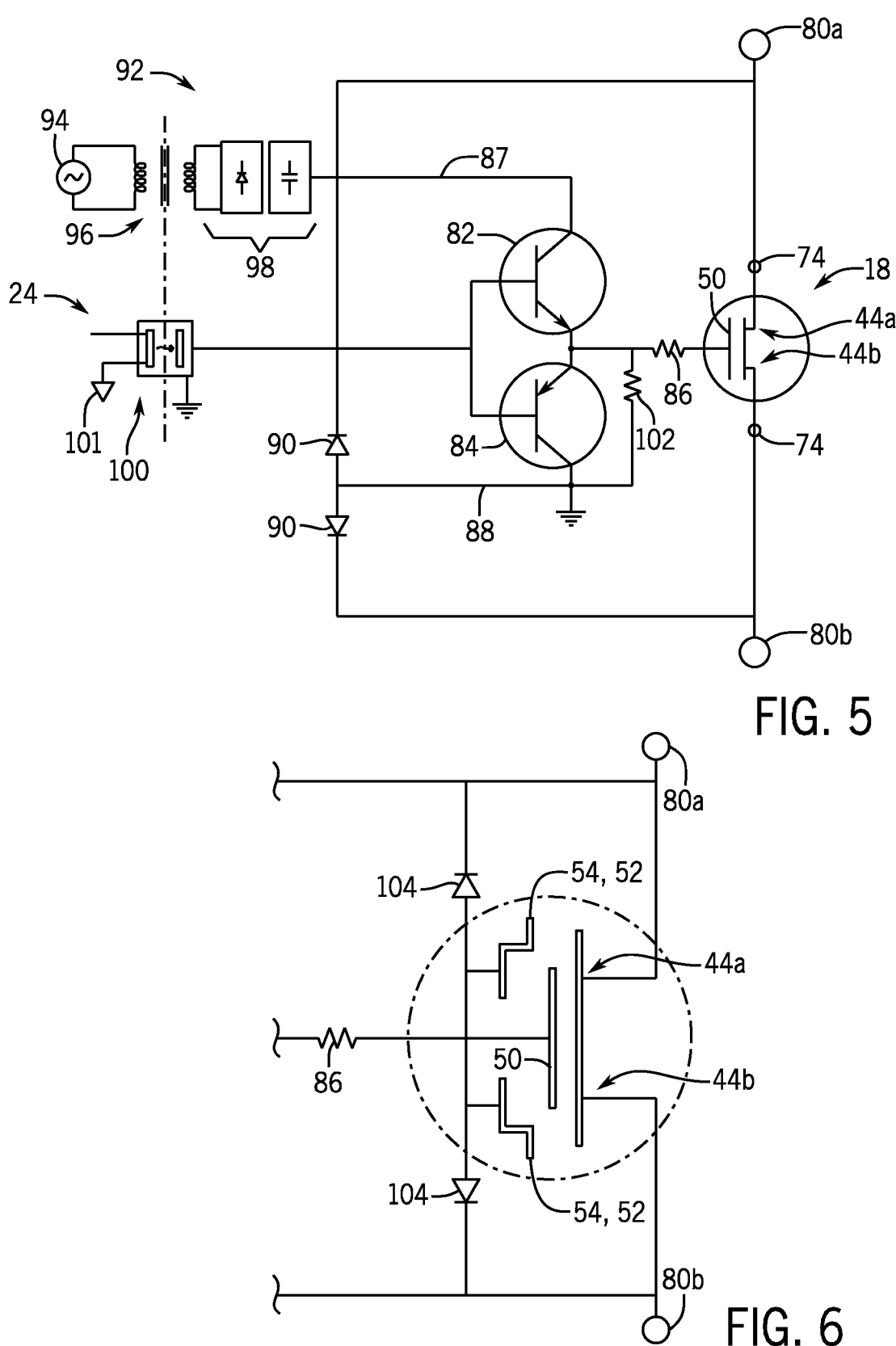
FIG. 5 is a schematic diagram of a drive circuit for use with the semiconductor switch element of FIG. 2, for example, when used in the circuits of FIGS. 1 and 2.
FIG. 6 is a fragmentary detail view of the semiconductor switch element of FIG. 5 showing one embodiment of additional circuitry for controlling the field plates of FIG. 3.

Referring now to FIG. 5, a drive circuit incorporating the bidirectional semiconductor switch 18 may present a first circuit terminal 80a and a second circuit terminal 80b communicating via conductive leads 74 with the respective channel electrodes 44a and 44b. During use, the polarity across terminals 80a and 80b will change, with terminal 80a at times being at a higher voltage than terminal 80b (a first polarity) and the voltage at terminal 80b at times being higher than the voltage at terminal 80a (a second polarity). In both cases the gate electrode 50 must be biased (positive in this example) with respect to the lowest voltage terminal 80.

For this purpose, in one embodiment, the drive circuit provides a floating gate drive using an NPN bipolar transistor 82 and a PNP bipolar transistor 84. A junction between the emitter of transistor 82 and the emitter of transistor 84 connects through a resistor 86 to the gate electrode 50. A collector of the NPN transistor 82 is attached to a positive voltage source 87 (to be described) and the collector of transistor 84 is attached to a floating ground 88.

The positive voltage source 86 may be provided by an isolated power supply, for example, a battery (not shown) having its positive terminal connected to the collector of the NPN transistor 82 and its negative terminal connected to the floating ground 88. Alternatively, the positive voltage source 86 may be in the form of a power supply 92 receiving power from an AC power source 94 through a transformer 96 and then rectifying and filtering that power 98 to provide a DC level of voltage, for example, 5 volts. In both examples, positive voltage source 86 may float with the floating ground 88.

The floating ground 88 operates to automatically track the voltage of the lowest voltage terminal 80a or 80b by means of a pair of fast switching diodes 90 such as high-voltage Schottky diodes (SiC) or series stacked low-voltage diodes. The anodes of each of the diodes 90 are connected together and attached to the floating ground 88, and the cathode of one diode is connected to terminal 80a and the cathode of the other diode is connected to terminal 80b. As such the floating ground 88 will always be within one diode drop of the lowest voltage potential terminal 80a and 80b.

Referring still to FIG. 5, bases of transistors 82 and 84 may be connected together to receive a control signal from an optoisolator 100 having an output reference to floating ground 88 to apply a control value to the transistors 82 and 84 referenced to the floating ground 88. The optoisolator 100 receives a signal from controller 24 referenced to a fixed ground 101 but galvanically isolated from the control value to the transistors 82 and 88 by optical means. When the voltage output from the optoisolator 100 is high, it biases transistor 84 off and transistor 82 on, applying a 5 V signal to the gate electrode 50 through resistor 86 as referenced to the floating ground 88 and thus the lowest potential terminal 80. This active biasing quickly charges the capacitance of the gate electrode 50 turning the bidirectional semiconductor switch 18 on. When the signal from the optoisolator 100 is low, it biases transistor 82 off and transistor 84 on to rapidly draw current out of the gate electrode 50 depleting the gate capacitance and turning the bidirectional semiconductor switch 18 off. An additional pulldown resistor 102 may be provided to further reduce the voltage on the gate electrode 52 below the saturation voltage of transistor 84 and may improve noise immunity, playing a role in biasing the diodes 90 and overcoming the parasitic capacitance of the circuit. This active sinking and sourcing of current from and to the gate electrode 50 allows high-speed switching of the bidirectional semiconductor switch 18 in excess of 500 Hz and operates equally for either polarity across terminals 80a and 80b by virtue of the changing voltage level of the floating ground 88.

Referring now to FIG. 6, a similar active biasing of the field plates 52 and 54 may be provided by the drive circuit. In one embodiment, the field plates 54 and 52 may be connected together and the drive circuit may ensure that for either polarity of voltage across terminals 80a and 80b the field plates 52 and 54 will be connected to the terminal 80 having the lowest voltage (normally a source terminal). In one embodiment this is provided by a diode pair 104 operating in a manner similar to diodes 90 of FIG. 5. The diodes 104 have their anodes connected together and to the field plates 54 and 52 and their respective cathodes connected to one of respective terminals 80a or 80b.

It will be appreciated that other circuits may be used to provide biasing to the field plates 52 and 54 and that this biasing can be provided selectively to different combinations of feel plates 52 and 54 and their left and right implementations.

As used herein, the term galvanic isolation is intended to refer to conductors that are electrically insulated against long-term DC current flow or ohmic current flow as opposed to capacitive interaction and the like.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including", and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An electrical power converter circuit comprising:
a set of bidirectional FET semiconductor switches each providing a semiconductor substrate having a first channel electrode and second channel electrode separated along a channel through the substrate and a gate electrode positioned along the channel between the first and second channel electrodes, where current flowing in a first polarity from the first channel electrode to the second channel electrode and current flowing in a second polarity from the second channel electrode to the first channel electrode are both controlled by a gate voltage applied to the gate electrode to switch between current flow and no current flow states; and
a gate drive circuit providing a gate drive signal to the gates of each of the bidirectional FET semiconductor switches dynamically referenced to a varying selected one of the first channel electrode and second channel electrode depending on a polarity of current flow between the first and second channel electrodes, the gate drive circuit including semiconductor switches sourcing and sinking current to and from the gates.

2. The electrical power converter circuit of claim 1 wherein the gate drive circuit provides a switching speed in excess of 1 kHz.

3. The electrical power converter circuit of claim 1 wherein the electrical power converter circuit provides an average output current in excess of 1 A and an average output voltage in excess of 100 V.

4. The electrical power converter circuit of claim 1 further including a semiconductor switch drive providing a control signal to the semiconductor switches having an on-state for sourcing current to the gate by the semiconductor switches and off-state for sinking current from the gate by the semiconductor switches during each polarity of current flow.

5. The electrical power converter circuit of claim 4 further including an electrical isolator providing galvanic isolation between the control signal and the semiconductor switches.

6. The electrical power converter circuit of claim 4 further including a galvanically isolated DC power supply providing a voltage to the semiconductor switches.

7. The electrical power converter circuit of claim 6 wherein the semiconductor switches provide series-connected solid-state switches communicating with the gate at their junction, with a first switch controlling current flow from the DC power supply to the gate and a second switch controlling current flow from the gate to a ground referenced to a given one of the first and second channel electrodes having a lower voltage.

8. The electrical power converter circuit of claim 7 wherein the first switch is an NPN transistor and the second switch is a PNP transistor.

9. The electrical power converter circuit of claim 7 further including a diode half-bridge providing series-connected diodes having at their junction the ground reference with a first diode connected between the ground reference and a first channel electrode communicating with a cathode side of the first diode, and a second diode connected between the ground reference and a second channel electrode communicating with a cathode side of the second diode.

10. The electrical power converter circuit of claim 1 wherein the bidirectional FET semiconductor switches further include at least one field plate positioned over the channel to at least one side of the gate and free from a fixed galvanic connection to any of the gate electrode and the first and second channel electrodes.

11. The electrical power converter circuit of claim 10 wherein the electrical power converter circuit provides a biasing switch connecting the at least one field plate to a given one of the first and second channel electrodes having a lower voltage.

\* \* \* \* \*